United States Patent
Bogue et al.

[15] 3,693,068
[45] Sept. 19, 1972

[54] ELECTRICAL POWER SUPPLY COMPRISING SEQUENTIALLY ACTIVATED BATTERIES

[72] Inventors: John C. Bogue, 101 Ocean Avenue; Robert I. Sarbacher, 708 4th St., both of Santa Monica, Calif. 90402

[73] Assignee: said Bogue, by said Sarbacher

[22] Filed: July 8, 1970

[21] Appl. No.: 53,097

[52] U.S. Cl. ..................320/13, 320/46, 136/162
[51] Int. Cl. .............................................H01m 45/00
[58] Field of Search..........320/46, 17, 18, 47, 52, 55, 320/13; 136/113, 114, 162

[56] References Cited

UNITED STATES PATENTS

| 3,592,697 | 7/1971 | Braun | 136/162 |
| 3,505,584 | 4/1970 | Ford et al. | 320/17 |
| 3,413,536 | 11/1968 | Webb | 320/17 |
| 3,481,791 | 12/1969 | Orsino | 136/113 |
| 3,100,862 | 8/1963 | Collier | 320/46 |
| 3,222,225 | 12/1965 | Amiet et al. | 136/162 X |
| 2,496,859 | 2/1950 | Dalzell | 320/19 |

FOREIGN PATENTS OR APPLICATIONS 855,935  12/1957  Great Britain...............320/46

*Primary Examiner*—J. D. Miller
*Assistant Examiner*—Robert J. Hickey
*Attorney*—Fred L. Witherspoon, Jr. and Anthony T. Lane

[57] ABSTRACT

An electrical power supply, particularly adapted for intermittent use, has an extremely long standby life. A series of squib actuated electrochemical batteries are controlled by a selective activation circuit, so that each reserve or secondary battery of the series is activated only after the preceding battery has substantially spent its useful life. The circuit responds to an increase in pressure within the battery encapsulation signaling the end of the battery's useable lift, to substitute the next battery in the series, and to activated it by firing its squib.

13 Claims, 7 Drawing Figures

PATENTED SEP 19 1972    3,693,068
SHEET 1 OF 2
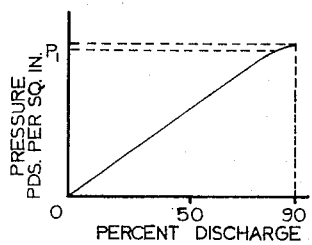
FIG. IB.
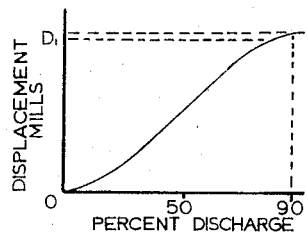
FIG. IA.
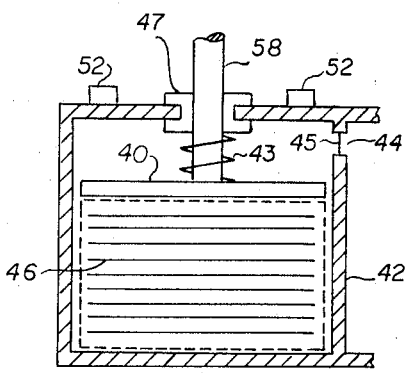
FIG. 2
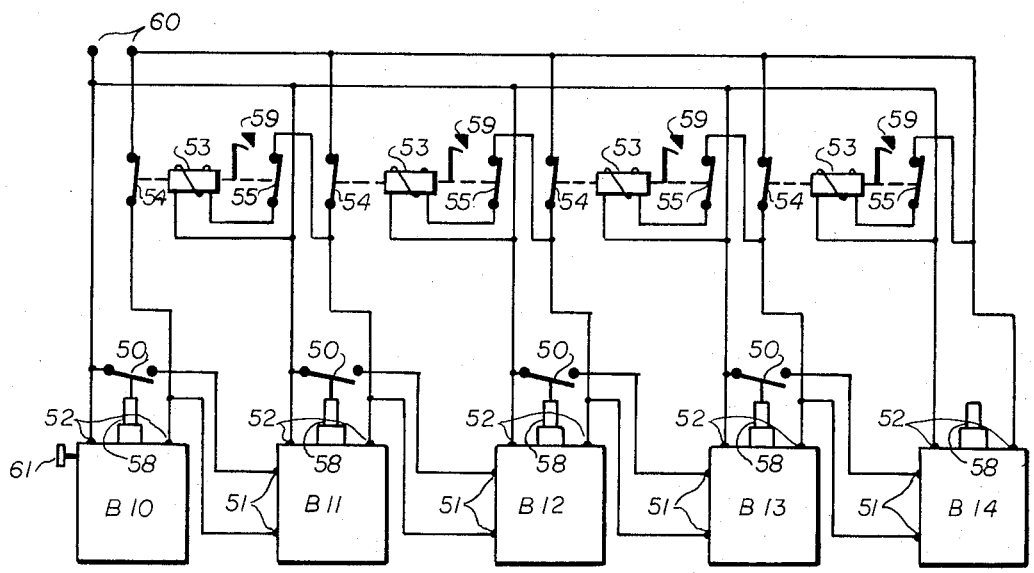
FIG. 3
INVENTORS
JOHN C. BOGUE
ROBERT I. SARBACHER

PATENTED SEP 19 1972 3,693,068

INVENTORS
JOHN C. BOGUE
ROBERT I. SARBACHER 3,693,068

ELECTRICAL POWER SUPPLY COMPRISING SEQUENTIALLY ACTIVATED BATTERIES

BACKGROUND OF INVENTION

There are a number of instances where a standby source of electrical power is needed, so that power is available when required, but where the total quantity of power required over a long period of time is not great. Further, installations requiring such power service are sometimes remote and not reasonably accessible. One such environment is underwater transponder sonobuoys utilized for navigational guidance purposes. The only practical method of powering the transponder circuitry of these buoys is by electrochemical batteries, and a significant limiting factor in the useful life of these devices is therefore the shelf and/or standby life of the battery power supply.

Power supplies whose shelf life prior to activation is essentially unlimited, and whose standby life once activated is extremely long are disclosed in our copending applications Ser. Nos. 884,783 and 879,158. Copending application Ser. No. 884,783 was filed Dec. 15, 1969 and is titled "Electrical Power Supply." Similarly, copending application Ser. No. 879,158 was filed Nov. 24, 1969 and is titled "Electrical Power Supply." This application is directed to an activation system responsive to electrode expansion for activating the batteries of a power supply such as that shown in FIG. 4 of said copending application Ser. No. 884,783.

SUMMARY OF THE INVENTION

This invention relates generally to power supplies of the type described in our said copending applications and more specifically to such power supplies using a plunger responsive to electrode expansion for the activation of the batteries making up the power supply.

As is the case with the power supplies described in said copending applications, the power supply of this invention utilizes reserve or dry charged secondary electrochemical batteries. Reserve primary cell batteries and dry charged secondary batteries are known in the art. They are batteries wherein the electrodes are fully assembled for operation, but the electrolyte is held in reserve in a separate container which may be within the battery housing. Since there is no consumption of the electrodes under these circumstances, the shelf life of the battery is essentially indefinite. However, once the electrolyte is released from its reserve container, such as by mechanical puncture, explosive squib rupture, or any other means as are well known in the art, the battery is activated, and thereafter has a limited standby life.

In accordance with present invention, a series of reserve primary cell batteries or dry charged secondary batteries are employed in combination with a selective activation circuit. When all batteries of the system are in reserve status, the shelf life of the power supply is practically indefinite. However, once the first battery is activated, the standby life of the system is limited; but because of selective or controlled sequential activation of the series of batteries, an extremely long standby life is obtained. The total standby life of the power supply is a function of the standby characteristics of the individual batteries and the number of batteries in the series, and is the sum of the individual standby lives of all the batteries in the series.

One circuit is described. This circuit is based on the nearly linear relation between internal pressure exerted by the electrodes within the battery and their state of discharge. Internal pressure within the battery, generated by the electrodes during discharge, activates a piston which moves responsive to the pressure exerted upon it by the electrode expansion. Such valves are known in the art. When the pressure in the battery reaches a given point indicating a state of discharge, the next battery in the series is activated due to the movement of the piston associated with the discharged battery. Thus, as the useful life of an activated battery nears its end the next battery in the series is substituted for the expended battery.

Thus the next battery in the series is activated to provide the necessary electrical energy until its useful life approaches an end, whereupon the selective activation circuit substitutes the following battery in the series.

BRIEF DESCRIPTION OF THE DRAWINGS

Specific features of the invention will become readily apparent from the following detailed description when read in conjunction with the annexed drawings.

FIG. IA is a graph showing the characteristic curve of the pressure developed by the electrodes of a battery as a function of the percent discharge of the battery;

Figure 4A:
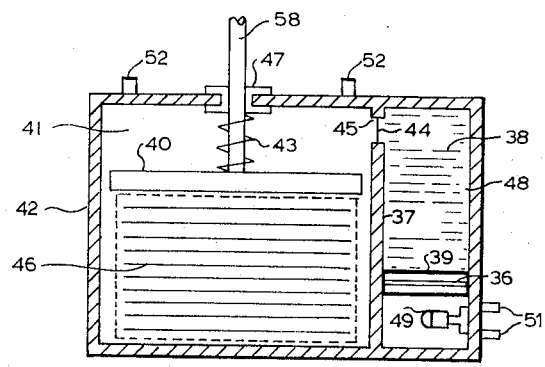
Figure 4B:
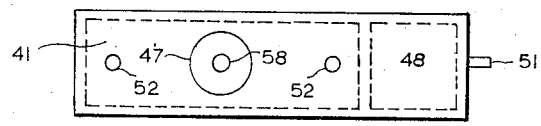
Figure 5:
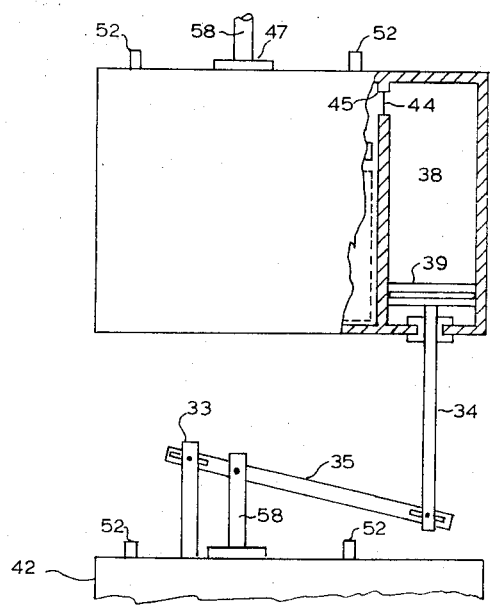

FIG. IB is a graph showing the characteristic curve of the displacement produced through expansion of the electrodes of a battery as a function of the percent of discharge of the battery;

FIG. 2 is a cross-sectional view of the electrode compartment of a reserve battery container showing a cross-section of the pressure responsive piston;

FIG. 3 is a schematic diagram illustrating a power supply such as shown in FIG. 4 of said copending application Ser. No. 884,783 with the electrode expansion responsive piston of the invention;

FIG. 4A is a cross-sectional view of a reserve battery container showing the electrode and electrolyte compartments and a squib actuated piston;

FIG. 4B is a top view of this reserve battery indicating the electrode and electrolyte compartments; and FIG. 5 is a partial cross-sectional view of a reserve battery which is mechanically actuated by another reserve battery where only a mechanical actuating system is shown together with the electrolyte piston.

DETAILED DESCRIPTION OF INVENTION

A series of batteries B10 through B14 is shown in FIG. 3 of the drawings. Batteries B10 through B14 are only schematically represented, because various structures therefore are well known in the art, and the details thereof are not material to the present invention. Each of these batteries is an electrochemical primary cell reserve battery or dry charged secondary battery. Battery B10 may be mechanically or manually activated, as suggested by the plunger 61.

A method to effect the actuation of successive batteries may be based on the relationship of internal electrode pressure within the sealed container of a battery and the degree of discharge of the battery. This relationship is shown in FIG. IA where a generic plot of this pressure in pounds per square inch is shown as a function of the degree of discharge of the battery. For example, in a magnesium/magnesium-pechlorate/mercuric oxide cell this pressure and displacement is due in part to the formation of magnesium hydroxide according to the reaction taking place during discharge:

$$Mg + H_2O + \tfrac{1}{2}O_2 \rightarrow Mg(OH)_2$$

Both the weight and thickness of the magnesium electrode is increased by this action producing an expansion of the electrodes. If during manufacture of the battery, provision is not made to allow for this expansion, the case containing the battery may be broken.

A generic plot of the displacement in mills as a function of the percent discharge of the battery, as the pressure holding the electrodes together is held constant, is shown in FIG. IB.

Originally, the pressure in the battery container may be negative due to the vacuum in the plate compartment of the battery put there at the time of manufacture to preserve the electrodes and to suck in the electrolyte at such time as the container in which the electrolyte is stored, is punctured or otherwise broken. As discharge of the battery continues after activation, the mechanical pressure produced by the expansion of the electrodes continually rises until the pressure reaches the value P1 indicated in FIG. IA.

Pistons actuated by pressure are of course well known in the art. In FIG. 2 is shown a piston 40 together with a cross section of the battery container 42, having terminals 52. The piston rod 58 passes through the rubber gromet 47 sealing the opening in the battery container. As the pressure of the electrodes against the piston rises the piston is pushed upward forcing the piston 40 toward the top of the container 42.

This action results in the closing of switch 50, FIG. 3, at which time the squib terminal 51 of battery B11 receives a voltage sufficient to activate the squib connected to these terminals. As has been mentioned above, the power supply shown in FIG. 3 is essentially identical to the power supply shown in FIG. 4 of said copending application Ser. No. 884,783. However, this circuitry will be described in detail since (1) the circuitry as shown is utilized with the electrode expansion responsive piston of this invention and (2) the circuitry as shown except for switches 50, squib terminals 51 and the circuitry interconnecting switches 50 and their associated squib terminals is the circuitry used in the embodiment shown in FIG. 5. As was mentioned above the piston utilized with each battery of this invention is responsive to the expansion of the battery electrodes caused by discharge of the battery. In copending application Ser. No. 884,783 a valve and piston rod responsive to the internal battery gas pressure for activation of the battery rather than electrode expansion are used in connection with switches 50 and squibs to activate the next battery. As will be apparent later, the switches 50 and the squib terminals are replaced by the mechanical piston arrangement shown in FIG. 5.

Battery B10 may be mechanically or manually activated, as suggested by the plunger 61. When plunger 61 is depressed, it punctures the electrolyte container in the battery housing, and thereby releases the electrolyte to the electrode compartment of the battery.

The remaining batteries B11 through B14 are activated by the firing of an electrically detonated small explosive squib within the battery casing. Thus, each of the latter batteries is provided with squib firing terminals indicated by the numeral 51. All of the batteries have the usual output terminals 52.

When the power supply is first put into service, one output terminal of each battery is connected through a switch 54 (except the last battery, B14) to one of the output terminals 60 of the power supply. The other output terminal of each battery is connected directly to the other of the output terminals 60 of the power supply. Until activated the internal impedence of these batteries is very high and does not effect the operation of the system.

Following initial activation, when battery B10 reaches a 90 to 95 percent discharge condition, the piston rod 58 rises to the point where it closes switch 50 energizing the squib of battery B11. As soon as battery B11 is activated, the solenoid 53 is energized opening switch 54 disconnecting battery B10 from the system. Simultaneously switch 55 is opened which disconnects the solenoid 53 from the battery B11. The retainer 59 then holds switches 54 and 55 in an open position permanently, throughout the remaining life of the power supply, effectively disconnecting battery B10 from the system.

Operation of the power supply FIG. 3, for activation of the succeeding batteries is the same as described above and will therefore be apparent.

FIG. 4A shows a battery container 42 which includes a compartment 48 for the electrolyte 38 as well as the compartment 41 for the electrodes. A piston 39 is shown in the electrolyte compartment. This piston has a rubber gasket 36. The piston is acted upon by the gas pressure created when the squib 49 is fired, by the application of a suitable potential to the squib terminal 51. The gas pressure generated applies pressure to the piston 39 forcing the electrolyte to break the diaphram 44 and flow through the opening 45 into the partially evacuated electrode compartment 41, thus energizing the battery. The partition 37 separates the electrode and electrolyte compartments in the battery container 42. The electrodes 46 are indicated.

FIG. 4B is a plan or top view of the battery indicating the electrode compartment 41, the electrolyte compartment 48, the squib terminals 51, the battery terminals 52, the grommet 47 and the piston rod 58.

The operation of the power supply can be effected without the use of squibs by employing a mechanical arrangement such as shown in FIG. 5. As the battery 42 is discharged, the piston rod 58 is forced upward pushing the lever arm 35 against the piston rod 34 when the other end of the lever arm is held by the fulcrum 33. The piston 39 exerts pressure on the electrolyte which in turn forces the diaphram 44 to break allowing the electrolyte to enter the plate compartment of the battery.

From the foregoing description, it will be appreciated that there is provided a standby battery power supply whose life is as long as the sum of the standby lives of all the batteries used in the battery series. An exceptional standby life for the power supply is obtained by the use of reserve cell batteries or dry charged batteries in combination with a selective activation circuit or device. When the useful life of the activated battery approaches its end, the activation circuit substitutes the next battery for the spent one, and simultaneously activates it by releasing its electrolyte to the battery electrode compartment. It is apparent that batteries other than reserve cell batteries or dry charged batteries can be employed, but the standby life will be shortened by the shelf life losses of those batteries in the supply awaiting utilization.

Many modifications and variations of the illustrated embodiment will be apparent to those skilled in art. Accordingly such variations and modifications as are embraced by the spirit and scope of the appended claims are considered to be within the purview of the present invention.

What is claimed is:

1. A power supply comprising:
   output terminals;
   a plurality of normally inactive batteries, said plurality of batteries each having an output voltage of zero when inactive and an output voltage greater than zero when active;
   means for activating a first one of said plurality of batteries;
   means responsive to internal battery pressure for sequentially activating said plurality of batteries, one at a time, after said first one has been activated when said internal battery pressure of said just previously activated battery reaches an abnormal level;
   means for applying the output voltage of each of said plurality of batteries, including said first battery to said output terminals when said battery is activated; and
   means for removing the output voltage of each battery, except the last battery activated, when said internal battery pressure reaches said abnormal level, whereby said plurality of batteries are sequentially activated and the output voltage of each battery is sequentially applied and removed from said output terminals.

2. A power supply as defined in claim 1 wherein said plurality of batteries are dry charged batteries.

3. A power supply as defined in claim 1 wherein said plurality of batteries are reserve cell batteries.

4. A power supply as defined in claim 1 wherein said means for applying said output voltage of each battery to said output terminals when the battery is activated comprises a plurality of relays one less in number than the number of said plurality of batteries, said plurality of relays each having first and second normally closed contacts, each of said first contacts of said plurality of relays being coupled between said output terminals and a different one of said plurality of batteries except for the last battery activated, said last battery activated being directly connected to said output terminals.

5. A power supply as defined in claim 4 wherein said relays are each sequentially activated by a different battery of said plurality of batteries, except said first one, when the said battery associated with that relay is activated and means are provided to lock open said first and second contacts of each said relay when the relay is energized thereby permanently uncoupling the just previously activated battery from said output terminals when said internal battery pressure of that battery reaches said abnormal level.

6. A power supply as defined in claim 1 wherein said means for sequentially activating said plurality of batteries includes a piston arrangement associated with each battery.

7. A power supply as defined in claim 5 wherein a first and second plunger is provided with each of said batteries, said first plunger of each battery rising above the top of its associated battery when said internal battery pressure reaches said abnormal level; a movable mechanical linkage connecting said first plunger of each of said batteries to the said second plunger of the battery that is to be activated next after the battery with which the said first plunger is associated has been activated the movement of said first plunger to the top of its associated battery when its associated battery reaches said abnormal level of battery pressure being transmitted to its associated second plunger by said movable mechanical linkage in such a manner as to activate the battery associated with that second plunger.

8. A power supply as defined in claim 7 wherein said plurality of batteries are reserve cell batteries.

9. A power supply as defined in claim 7 wherein said batteries are dry charged batteries.

10. A power supply as defined in claim 6 wherein each one of said plurality of batteries except for the first one activated includes an explosive squib utilized to activate its associated battery, said first battery activated having a mechanical plunger for activation thereof.

11. A power supply as defined in claim 10 wherein said squibs are each provided with two electrical terminals for activation from the power available from the previously activated battery, said terminals of each squib being coupled to a single different battery in such a manner that the battery associated with that squib is activated from the power available from the battery to which said squib terminals are coupled when the battery pressure of said battery to which said squib terminals are coupled reaches said abnormal level.

12. A power supply as defined in claim 11 wherein separate switch means are utilized to couple said squibs to said single different battery, said switch means being connected between the first of said two squib terminals and one of the battery output terminals in such a manner that said first squib terminal of each squib is coupled to an output terminal of one battery different than the battery associated with said squib, the second terminal of said two terminals of each squib being connected directly to the other battery output terminal of the battery to which said first terminal is coupled.

13. A power supply as defined in claim 12 wherein each of said switches is so positioned that it is closed by said piston associated with the battery with which that switch is associated when the said battery pressure reaches an abnormal level.

* * * * *